US011352057B2

(12) United States Patent
Dreyer et al.

(10) Patent No.: US 11,352,057 B2
(45) Date of Patent: Jun. 7, 2022

(54) CONTROL SYSTEM FOR DUAL PATH MACHINE

(71) Applicant: AGCO CORPORATION, Duluth, GA (US)

(72) Inventors: Daniel Dreyer, Hesston, KS (US);
Shane Bollinger, Hesston, KS (US);
Brendon Charles Nafziger, Hesston, KS (US); Friedrich Robert Honeyman, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 187 days.

(21) Appl. No.: 16/742,581

(22) Filed: Jan. 14, 2020

(65) Prior Publication Data

US 2020/0231208 A1    Jul. 23, 2020

Related U.S. Application Data

(60) Provisional application No. 62/793,647, filed on Jan. 17, 2019.

(51) Int. Cl.
*B62D 9/00* (2006.01)
*A01B 69/04* (2006.01)
(Continued)

(52) U.S. Cl.
CPC .............. *B62D 9/00* (2013.01); *A01B 69/008* (2013.01); *B62D 1/12* (2013.01); *B62D 5/043* (2013.01);
(Continued)

(58) Field of Classification Search
CPC . B62D 9/00; B62D 1/12; B62D 5/043; B62D 5/0487; B62D 6/00; B62D 15/021; A01B 69/008
See application file for complete search history.

(56) References Cited

U.S. PATENT DOCUMENTS

2013/0075169 A1    3/2013  Otto
2013/0154219 A1    6/2013  Stanley
(Continued)

FOREIGN PATENT DOCUMENTS

GB        2 562 378 A     11/2018
WO     2017/201445 A1     11/2017

OTHER PUBLICATIONS

European Patent Office, Search Report prepared for related European Application No. EP 19213799.0, dated Jun. 15, 2020.
(Continued)

*Primary Examiner* — Rachid Bendidi
*Assistant Examiner* — Andrew J Cromer

(57) ABSTRACT

A dual path agricultural machine including a control system having a number of input sensors, status sensors, and output sensors, and a controller configured to operate the dual path machine in a stability control mode and a selective rear-steer engagement and actuation mode. In the stability control mode, the controller adjusts an actual drive output of the dual path machine according to data received from the input sensors and feedback received from the output sensors so as to reduce a difference between the actual drive output and a desired drive output. In selective rear-steer engagement and actuation mode, the controller engages rear-steer mechanisms with caster wheels of the dual path machine and actuates the caster wheels via the rear-steer mechanisms if a criterion is satisfied. The controller disengages the rear-steer mechanisms from the caster wheels or does not actuate the caster wheels if the criterion is not satisfied.

29 Claims, 4 Drawing Sheets

(51) Int. Cl.
  *B62D 1/12* (2006.01)
  *B62D 5/04* (2006.01)
  *B62D 6/00* (2006.01)
  *B62D 15/02* (2006.01)

(52) U.S. Cl.
  CPC ............. *B62D 5/0487* (2013.01); *B62D 6/00* (2013.01); *B62D 15/021* (2013.01)

(56) References Cited

U.S. PATENT DOCUMENTS

| | | | |
|---|---|---|---|
| 2015/0223386 A1* | 8/2015 | Nafziger | A01D 43/105 180/6.24 |
| 2016/0037706 A1 | 2/2016 | Bebernes et al. | |
| 2016/0037707 A1* | 2/2016 | Bebernes | B62D 11/003 180/6.48 |

OTHER PUBLICATIONS

UK Intellectual Property Office, Search Report prepared for related Application No. GB 1902434.8, dated Aug. 23, 2019.

* cited by examiner

CONTROL SYSTEM FOR DUAL PATH MACHINE

BACKGROUND

Dual path machines such as windrowers are typically driven on uneven and sometimes muddy surfaces. Without a positively-controlled steered axle, a dual path machine relies on traction to perform both propulsion and steering. Loose gravel and mud can slow the responsiveness of the drive train. If an operator applies too much acceleration or too rapid of steering for the ground conditions at that time, machine motion can be less than expected. In the condition that a machine is brought to a stop in mud, and one of the driven tires becomes stuck, there is a chance that the machine will pivot around the stuck tire. This is possible because rear casters will pivot to allow full range of motion.

Some dual path agricultural machines include hydraulic damping steer-assist systems coupled to their caster wheels. However, these systems only smooth out motion and do not assist in conditions where loss of traction on one tire causes machine motion to not match the steering input. A positively-controlled steered caster can allow a machine to redirect tractive effort to overcome a stuck tire. Current positively-controlled steering systems must be manually engaged and disengaged, which hinders maneuverability in field conditions.

SUMMARY

Embodiments of the invention solve the above-mentioned problems and other problems and provide a distinct advance in the art of control systems for dual path agricultural machines. Specifically, the invention provides a control system that improves stability, responsiveness, and predictability of a dual path agricultural machine.

An embodiment of the control system is configured for use with a windrower having a chassis, an engine compartment, a cab, a drive system, left and right drive wheels, left and right caster wheels, left and right rear-steer mechanisms, a harvesting component, and a number of user drive input mechanisms.

The chassis supports the engine compartment, cab, harvesting component, and drive system and may include a number of frame rails, cross beams, and other structural members. The chassis may also include a number of mounting points for mounting the above components to the chassis.

The engine compartment encloses the engine and other components of the drive system and is mounted on the chassis behind the cab. The engine compartment may include doors and/or removable access panels for servicing the engine.

The cab protects a user (hereinafter "driver") and the user drive input mechanisms from outside elements and may include an enclosed canopy having a door and several windows or windshields. A seat and other ergonomic features from which the driver may control the dual path agricultural machine may be positioned in the cab.

The drive system powers the drive wheels and the harvesting component and includes an engine and a drive train. The engine may be a gasoline or diesel internal combustion engine or any other suitable power source. The drive train transfers power from the engine to the drive wheels and may include drive shafts, drive belts, gear boxes, hydraulic or pneumatic lines and valves, and the like.

The left and right drive wheels are large driven wheels positioned near a front end of the chassis and are substantially identical to each other. Each drive wheel rotates about a lateral axis and is driven independently from the other drive wheel.

The left and right caster wheels are non-driven wheels spaced behind the drive wheels and are substantially identical to each other. Each caster wheel is configured to swivel about a vertically extending axis in either a free-wheeling mode or a steering mode.

The left and right rear-steer mechanisms selectively actuate the caster wheels and are substantially identical to each other. Each rear-steer mechanism may include a tie rod, a rack-and-pinion mechanism, gears, hydraulic components, pneumatic components, a rotary motor, or any other suitable actuation components. In one embodiment, the rear-steer mechanisms are configured to be selectively engaged with and disengaged from the caster wheels.

The harvesting component cuts and swaths crops into a windrow and may be removably mounted to the front end of the chassis. The harvesting component may be configured to be selectively deactivated and/or disengaged and controlled via user inputs.

The user drive input mechanisms allow the driver to provide user drive inputs and include a steering wheel and a forward-neutral-reverse lever. Alternatively, the drive input mechanisms may include handlebars, an acceleration pedal, a brake pedal, a yoke, a joystick, an analog or virtual control panel, and other inputs. The user drive input mechanisms may also be virtual controls implemented on a display screen of an integrated or an external computing device such as a smartphone, a tablet, or a remote control device.

The control system of the present invention controls the drive system, drive wheels, harvesting component, and rear-steer mechanisms to more accurately effect the driver's commands. An embodiment of the control system comprises a number of input sensors, a number of status sensors, a number of output sensors, and a controller. The control system may be integrated into existing control systems of the dual path agricultural machine or may comprise dedicated hardware and software or even external computing devices such as a smartphone, a tablet, or a remote computing system.

The input sensors interface with the user drive input mechanisms for sensing positions, orientations, or states of the user drive input mechanisms. The input sensors may be switches, electrical resistance sensors, temperature sensors, touch sensors capacitance sensors, position sensors, angle sensors, speed sensors, proximity sensors, Hall-effect sensors, accelerometers, gyroscopes, pressure sensors, time-of-flight sensors, optical sensors, imaging sensors, cameras, and the like.

The status sensors interface with the drive wheels, the caster wheels, the harvesting component, the drive system, the rear-steer mechanisms, and/or the user drive input mechanisms for sensing statuses of the interfaced devices or statuses of the dual path agricultural machine via the interfaced devices. The status sensors may be switches, electrical current sensors, electrical resistance sensors, temperature sensors, capacitance sensors, position sensors, angle sensors, speed sensors, proximity sensors, inductive sensors, Hall-effect sensors, compass, inertial sensors, accelerometers, gyroscopes, pressure sensors, viscosity sensors, composition sensors, fluid flow sensors, acoustic sensors, wave interference sensors, radio receivers, GPS receivers, radar sensors, time-of-flight sensors, optical sensors, imaging sensors, cameras, engine rpm sensors, caster wheel angle sensors, drive wheel differential sensors, and the like.

The output sensors interface with the drive wheels, the caster wheels, the rear-steer mechanisms, the harvesting component, the drive system, and/or the user drive input mechanisms for sensing outputs of the interfaced devices and hence the dual path agricultural machine. The output sensors may be switches, electrical current sensors, electrical resistance sensors, temperature sensors, capacitance sensors, position sensors, angle sensors, speed sensors, proximity sensors, inductive sensors, Hall-effect sensors, compass, inertial sensors, accelerometers, gyroscopes, pressure sensors, viscosity sensors, composition sensors, fluid flow sensors, acoustic sensors, wave interference sensors, radio receivers, GPS receivers, radar sensors, time-of-flight sensors, optical sensors, imaging sensors, cameras, engine rpm sensors, caster wheel angle sensors, drive wheel differential sensors, and the like.

The controller includes computing components such as a processor, memory, power components, and communication components for communicating with the input sensors, status sensors, output sensors, and other components. The controller implements a stability control mode and a selective rear-steer engagement and actuation mode in addition to and/or in conjunction with conventional dual path agricultural machine control modes. Alternatively, the controller may divided into multiple individual processing units that are in one or more separate enclosures. Portions of the control processing may exist within sensors or output devices such as motors, actuators or hydraulic valves, etc.

In the stability control mode, the driver provides a user drive input via the user drive input mechanisms. The user drive input may include several components such as a speed component and a steering component. In some implementations, the user may only specify a path or automated input source.

The input sensors detect the user drive input or the components or source configuration thereof. The input sensors generate a signal representative of the user drive input or configuration and send the signal to the controller.

The controller derives the user drive input from the above signal and generates a first control signal according to the user drive input. The first control signal represents instructions for the drive system to power the drive wheels so that they effect an actual drive output corresponding to the user drive input (and hence the desired drive output). The controller sends the first control signal to the drive system so that the drive wheels effect the actual drive output.

The output sensors detect the actual drive output. The output sensors generate a signal representative of the actual drive output and send the signal to the controller.

The controller receives the signal from the output sensors and determines a difference between the actual drive output and the desired drive output. This difference may include any combination of a difference in wheel speed, drive system speed, dual path agricultural machine location, change of location, heading, or change of heading, inertial state of machine, turning arc, drive wheel differential, caster wheel angle, and the like. For example, the difference may be caused by one or both of the drive wheels slipping on loose gravel.

The controller generates a second control signal based on the difference between the actual drive output and the desired drive output. For example, the second control signal may include instructions to increase wheel speed of the slipping wheel and increase the steering angle. The controller sends the second control signal to the drive system to adjust the actual drive output so as to reduce the difference between the actual drive output and the desired drive output.

The controller generates a third control signal including instructions to actuate one or both of the caster wheels via the rear-steer mechanisms in certain situations. For example, the controller may generate the third control signal for actuating the caster wheels if a ground speed of the dual path agricultural machine is greater than a minimum threshold ground speed, the steering angle is within a range allowed by rear-steer control, the change of steering angle is within a range allowed by rear-steer control, automated steering is enabled or disabled, automated steering is engaging or disengaging, a location of the dual path agricultural machine is within a prescribed area such as within a maximum distance from a road or outside of a maximum distance from a field path end, the dual path agricultural machine is undergoing back-and-forth motion, the dual path agricultural machine is on a lateral incline having an angle greater than a minimum threshold angle, and/or the harvesting component is disengaged.

The controller sends the third control signal to the rear-steer mechanism to actuate the caster wheels so as to further reduce the difference between the actual drive output and the desired drive output. This may be a corrected signal or only asserting the original steering command. In one embodiment, the controller may instruct the rear-steer mechanisms to actuate only one of the caster wheels while the other caster wheel is not actuated or is not engaged by the rear-steer mechanisms.

In the selective rear-steer engagement and actuation mode, one or more of the status sensors determines a status of the dual path agricultural machine. For example, the status may be a ground speed of the dual path agricultural machine, a turn angle of one of the caster wheels, a turn angle of the steering wheel, a location of the dual path agricultural machine according to a GPS receiver, or any other suitable status. The status sensor generates a signal representative of the status and sends the signal to the controller.

The controller compares the status from the one or more sensors against a criterion such as a minimum threshold ground speed. Other criteria may include a maximum threshold ground speed, a minimum or maximum turn angle of the steering wheel or one of the caster wheels, or any other suitable criteria. It may also compare previous values and/or derived values. Hysteresis, smoothing, dampening, or other additional conditioning may be included in the criteria logic.

The controller generates an activation signal for instructing the rear-steer mechanisms to engage positive control of the caster wheels if the status equates to or is within the above criterion or another criterion. The controller sends the activation signal to the rear-steer mechanisms so that the rear-steer mechanisms engage positive control of the caster wheels.

The controller also generates a control signal for instructing the rear-steer mechanisms to actuate the caster wheels if the status equates to or meets the criterion. For example, the controller may generate an actuation a control signal if the ground speed of the dual path agricultural machine is at least the minimum threshold ground speed. The controller sends the control signal to the rear-steer mechanisms so that the rear-steer mechanisms actuate the caster wheels. In some embodiments, the controller may engage positive control of the caster wheels and actuate it to a position that brings one or more of them to within a criterion if another criterion is met.

On the other hand, if the status does not equate to or is not within the criterion and the rear-steer mechanisms are currently activated, the controller generates a deactivation signal and sends the deactivation signal to the rear-steer mechanisms so as to disengage the rear-steer mechanisms from the caster wheels. That is, the caster wheels may be allowed to free-wheel if rear-steer actuation is not needed. Alternatively, the controller may cease actuation of the caster wheels while the rear-steer mechanisms remain engaged with the caster wheels. In some situations, the controller may delay or prediction to any of the criterion, activation, deactivation, or actuation signals.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
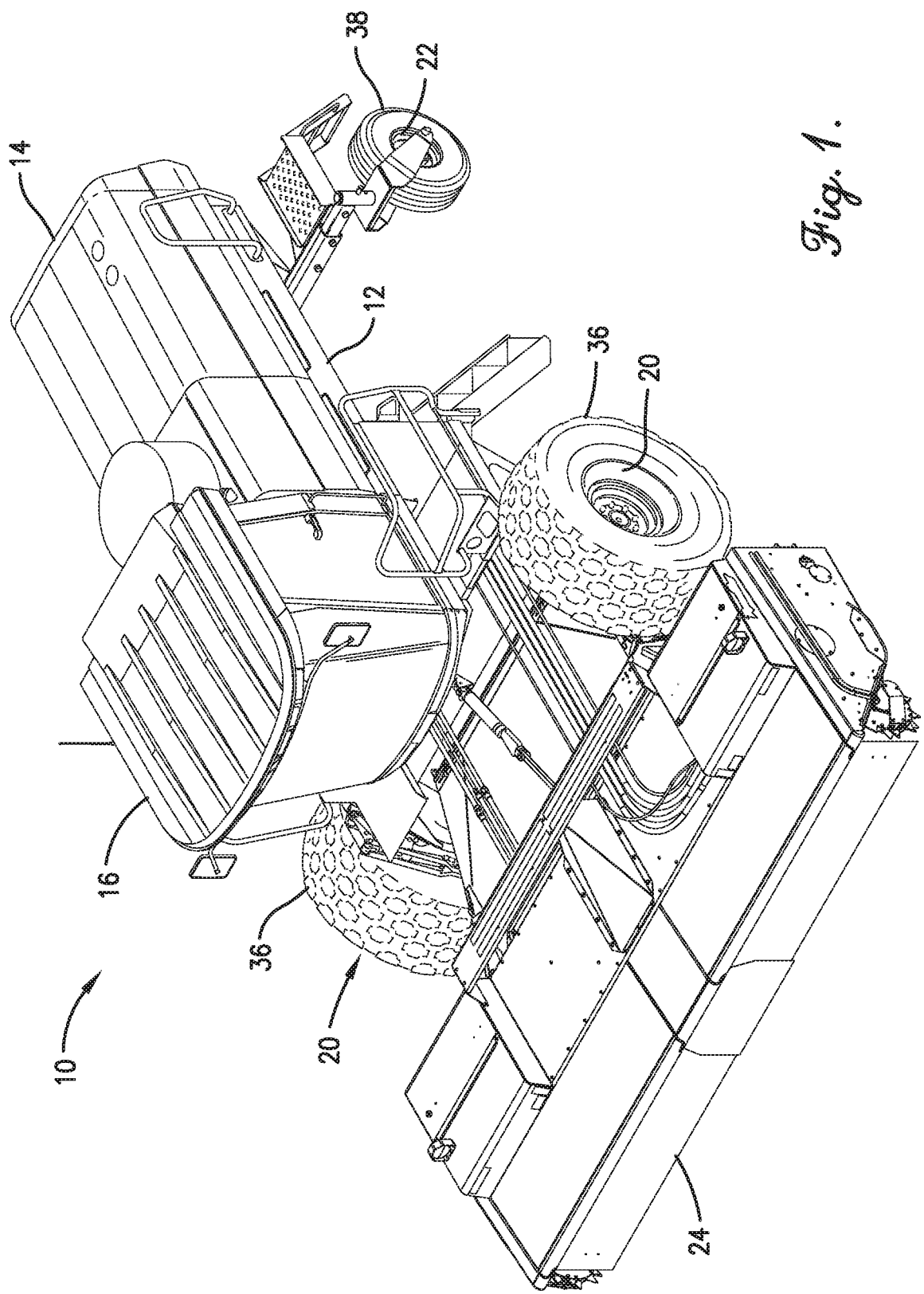
FIG. 1 is a perspective view of a windrower constructed in accordance with an embodiment of the invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
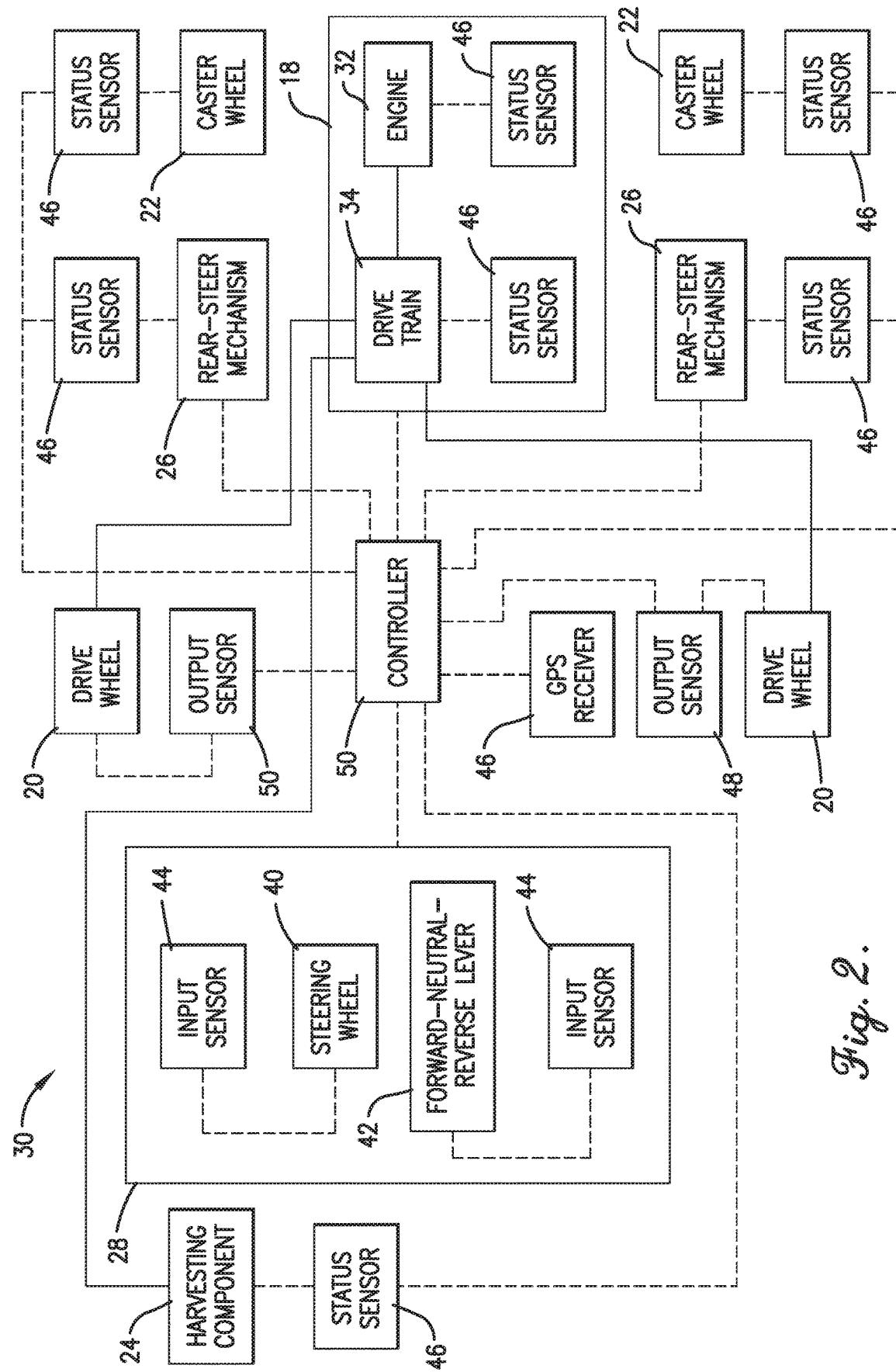
FIG. 2 is a schematic diagram of a control system of the windrower of FIG. 1.

Turning to FIGS. 1 and 2, a dual path windrower (hereinafter "dual path agricultural machine 10") in which a control system of the present invention may be incorporated is illustrated. The dual path agricultural machine 10 broadly comprises a chassis 12, an engine compartment 14, a cab 16, a drive system 18, left and right drive wheels 20, a set of caster wheels 22, a harvesting component 24, a set of rear-steer mechanisms 26, a number of user drive input mechanisms 28, and the aforementioned control system (hereinafter "control system 30").

The chassis 12 supports the engine compartment 14, cab 16, harvesting component 24 and drive system 18 and may include a number of frame rails, cross beams, and other structural members. The chassis 12 may also include a number of mounting bosses or mounting points for mounting the above components to the chassis 12.

The engine compartment 14 encloses the engine and other components of the drive system 18 and is mounted on the chassis 12 behind the cab 16. The engine compartment 14 may include doors and/or removable access panels for servicing the engine.

The cab 16 protects a user (hereinafter "driver") and the drive input mechanisms 28 from outside elements and may include an enclosed canopy having a door and several windows or windshields. A seat and other ergonomic features from which the driver may control the dual path agricultural machine 10 may be positioned in the cab 16. Alternatively, the user input mechanisms may be a user interface for the selection of control input from a remote or automated source such as GPS waylines or more advanced autonomous drive control.

The drive system 18 powers the drive wheels 20 and the harvesting component 24 and includes an engine 32 and a drive train 34. In some embodiments, the drive system 18 also powers the rear-steer mechanisms 26. The engine 32 may be a gasoline or diesel internal combustion engine or any other suitable power source. The drive train 34 transfers power from the engine 32 to the drive wheels 20 and may include drive shafts, drive belts, gear boxes, and the like. The drive train 34 may also include hydraulic or pneumatic lines, valves, and the like.

The drive wheels 20 are relatively large driven wheels that may include drive tires 36 mounted thereon. The drive tires 36 may include traction lugs or other features for improved grip. These could also be replaced with tracks on some agricultural machines. The drive wheels 20 may be positioned near a front end of the chassis 12 and may support a majority of the weight of the dual path agricultural machine 10. The drive wheels 20 may be non-steerable and independently driven.

The caster wheels 22 are relatively small non-driven wheels spaced behind the drive wheels 20 and may include non-drive tires 38 mounted thereon. The non-drive tires 38 may have annular ridges and/or grooves for allowing the non-drive tires 38 to more easily pass over mud, loose dirt, gravel, and other ground conditions. The caster wheels 22 may be configured to swivel about a vertically extending axis in either a free-wheeling mode or a steering mode as described in more detail below. In another embodiment, the caster wheels 22 are "front casters" spaced in front of the drive wheels 20. The tires 38 are not limited to being non-driven, and may have hydraulic or electric assist.

The harvesting component 24 cuts and swaths crops into a windrow and may be removably attached to the front end of the chassis 12. The harvesting component 24 may be driven by the drive system 18 via an auxiliary or power take-off (PTO) drive.

The rear-steer mechanisms 26 actuate the caster wheels 22 in select situations and may include tie rods, rack-and-pinion mechanisms, hydraulics, pneumatics, rotary motors, or any other suitable actuation components. In one embodiment, the rear-steer mechanisms 26 are configured to be engaged with and disengaged from the caster wheels 22. The rear-steer mechanisms 26 may be operated independently from each other or linked together. In another embodiment, a single rear-steer mechanism 26 actuates both caster wheels 22.

The user drive input mechanisms 28 allow the driver to provide user drive inputs and may include a steering wheel 40 and a forward-neutral-reverse lever 42. Alternatively, the drive input mechanisms 28 may include handlebars, an acceleration pedal, a brake pedal, a yoke, a joystick, and other inputs. The user drive input mechanisms 28 may also include virtual controls implemented on a display screen of a computing device. The computing device may be integrated into the dual path agricultural machine 10 or may be an external device such as a smartphone, tablet, or remote control.

The control system 30 controls the drive system 18, drive wheels 20, harvesting component 24, and rear-steer mechanisms 26 and includes a number of input sensors 44, a number of status sensors 46, a number of output sensors 48, and controller 50. The control system 30 may be completely integrated into the dual path agricultural machine 10 or may incorporate external components such as a driver's smartphone or tablet or other portable or remote or onboard control devices. The controller implements a stability control mode and a selective rear-steer engagement and actuation mode, which will be described in more detail below.

The input sensors 44 interface with the user drive input mechanisms 28 and may include a steering wheel sensor for sensing an angle of the steering wheel 40, a forward-neutral-reverse sensor for sensing a position of the forward-neutral-reverse lever 42, and any other suitable input sensors depending on the number and type of drive input mechanisms. The input sensors 44 may be switches, electrical resistance sensors, temperature sensors, touch sensors capacitance sensors, position sensors, angle sensors, speed sensors, proximity sensors, Hall-effect sensors, accelerometers, gyroscopes, pressure sensors, time-of-flight sensors, optical sensors, imaging sensors, cameras, and the like.

The status sensors 46 interface with the drive wheels 20, the caster wheels 22, the harvesting component 24, the drive system 18, the rear-steer mechanisms 26, and/or the user drive input mechanisms 28 for sensing statuses of the interfaced devices. Alternatively, some of the status sensors 46 may be standalone for sensing a status of the dual path agricultural machine 10 as a whole. The status sensors 46 may be switches, electrical current sensors, electrical resistance sensors, temperature sensors, capacitance sensors, position sensors, angle sensors, speed sensors, proximity sensors, inductive sensors, Hall-effect sensors, compass, inertial sensors, accelerometers, gyroscopes, pressure sensors, viscosity sensors, composition sensors, fluid flow sensors, acoustic sensors, wave interference sensors, radio receivers, GPS receivers, radar sensors, time-of-flight sensors, optical sensors, imaging sensors, cameras, coil output driver diagnostics, rear-steer position sensor diagnostics, and the like.

The output sensors 48 interface with the drive wheels 20, the caster wheels 22, the harvesting component 24, the drive system 18, the rear-steer mechanisms 26, and/or the user drive input mechanisms 28 for sensing an output of the interfaced device. Alternatively, some of the output sensors 48 may be standalone for sensing an output of the dual path agricultural machine 10 as a whole. The output sensors 48 may be switches, electrical current sensors, electrical resistance sensors, temperature sensors, capacitance sensors, position sensors, angle sensors, speed sensors, proximity sensors, inductive sensors, Hall-effect sensors, compass, inertial sensors, accelerometers, gyroscopes, pressure sensors, viscosity sensors, composition sensors, fluid flow sensors, acoustic sensors, wave interference sensors, radio receivers, GPS receivers, radar sensors, time-of-flight sensors, optical sensors, imaging sensors, cameras, engine rpm sensors, caster wheel angle sensors, drive wheel differential sensors, and the like.

The input sensors 44, status sensors 46, and output sensors 48 may be independent from each other or may have overlapping or dual purposes depending on the context, as described in more detail below. For example, an input sensor interfaced with the forward-neutral-reverse lever 42 may serve as both an input sensor (for sensing the driver's command to drive forward at 5 miles per hour) and as a status sensor (for sensing that the dual path agricultural machine 10 is currently in forward drive).

The controller 50 may include computing components such as a processor, memory, power components, and communication components for communicating with the input sensors 44, status sensors 46, output sensors 48, and other components. The controller 50 may perform all logic functions, or it may be divided into multiple individual controllers, each participating in the control execution. Portions of distributed control and signal processing may exist within input and output devices as well. The controller 50 may run a computer program stored in or on computer-readable medium residing on or accessible by the controller 50. The computer programs preferably comprise ordered listings of executable instructions for implementing logical functions in the controller 50. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium may be one or more components incorporated into the controller 50 and/or other devices of the control system 30.

The memory may include, for example, removable and non-removable memory elements such as RAM, ROM, flash, magnetic, optical, USB memory devices, and/or other conventional memory elements. The memory may store various data associated with the control system 30, such as the computer program and code segments mentioned above, or other data for instructing components of the dual path agricultural machine 10 to perform the steps described herein. Further, the memory may store data retrieved from the controller 50 and other components of the dual path agricultural machine 10 or other machines that act as data sources.

Stability Control Mode

Figure 3:
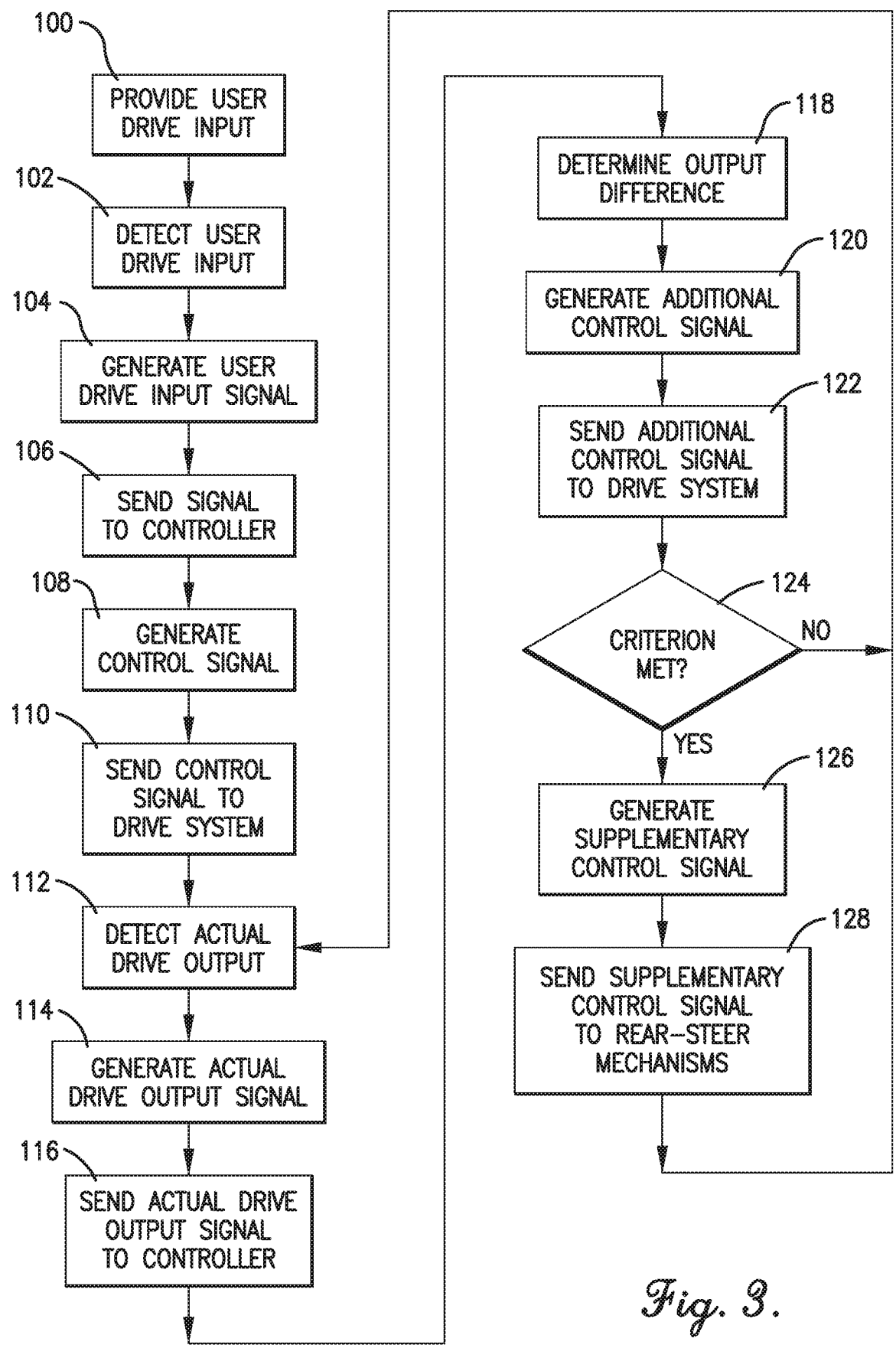
FIG. 3 is a flow diagram of a stability control mode implemented by the control system of FIG. 2.

The stability control mode will now be described in detail, with reference to FIG. 3. First, the driver may provide a user drive input via the user drive input mechanisms 28, as shown in block 100. For example, the driver may push the forward-neutral-reverse lever 42 to an intermediate forward position (i.e., a speed component of a user drive input) indicating a desire for the dual path agricultural machine 10 to travel forward at half speed (i.e., a speed component of a desired drive output). The driver may also turn the steering wheel 40 sixty degrees to the right (i.e., a steering component of the user drive input) indicating a desire for the dual path agricultural machine 10 to follow a tight right arc (i.e., a steering component of the desired drive output).

The input sensor 44 interfaced with the forward-neutral-reverse lever 42 may detect the intermediate forward position and the input sensor 44 interfaced with the steering wheel 40 may detect the sixty degree angle, as shown in block 102. The input sensor 44 interfaced with the forward-neutral-reverse lever 42 may generate a signal representative of the speed component and the input sensor 44 interfaced with the steering wheel 40 may generate a signal representative of the steering component, as shown in block 104.

The controller 50 may receive the signal representative of the speed component and the signal representative of the steering component, as shown in block 106. The controller 50 may interpret these signals separately to derive the user drive input. Alternatively, these signals may be combined into a single signal representative of the user drive input.

The controller 50 may generate a first control signal according to the user drive input, as shown in block 108. The first control signal may represent instructions for the drive system 18 to follow so that the drive wheels 20 effect an actual drive output corresponding to the user drive input (and hence corresponding to the desired drive output). For example, the instructions may include a specific engine rpm, a hydraulic valve position, or the like for the drive wheels 20 to collectively rotate at half speed with the left drive wheel turning faster than the right drive wheel so that the dual path agricultural machine 10 makes a tight right turn. The controller 50 may send the first control signal to the drive system 18 so that the drive wheels 20 effect the actual drive output, as shown in block 110.

The output sensors 48 may detect the actual drive output, as shown in block 112. For example, wheel sensors may sense an rpm or speed of the drive wheels 20. Alternatively, a GPS receiver may receive data representative of a location, direction, or ground speed of the dual path agricultural machine 10. The actual drive output may be directly or indirectly sensed by the output sensors 48.

The output sensors 48 may generate a signal representative of the actual drive output, as shown in block 114. The output sensors 48 may also send the signal representative of the actual drive output to the controller 50, as shown in block 116.

The controller 50 may determine a difference between the actual drive output and the desired drive output, as shown in block 118. The difference may include any combination of a difference in wheel speed, drive system speed, dual path agricultural machine location, turning arc, drive wheel differential, caster wheel angle, and the like. For example, the difference may be minus 1 mile per hour (e.g., the dual path agricultural machine is traveling slower than desired) and a distance of 1 meter (e.g., the dual path agricultural machine is outside of the desired arc). This may be caused by one or both of the drive wheels 20 slipping on loose gravel, for example.

The controller 50 may generate a second control signal based on the difference between the actual drive output and the desired drive output, as shown in block 120. For example, the second control signal may include instructions to increase wheel speed of the slipping wheel and increase the steering angle. The controller 50 may send the second control signal to the drive system 18 to adjust the actual drive output so as to reduce the difference between the actual drive output and the desired drive output, as shown in block 122.

Some dual path agricultural machines are also equipped with a form of secondary steering. In one embodiment, this secondary steering may be a positively-controlled rear-steer system. Regardless of the form of secondary steering or steering assist, in some situations, it may be desired to apply additional stability control. To that end, the controller 50 may compare a status of the dual path agricultural machine 10 against a criterion such as a threshold or state, as shown in block 124. On machines where a secondary steering or steering assist is optional, the criteria may be if that system is installed. On machines that do not support a secondary steering or steering assist, block 124, block 126, and block 128 may be not be included. The status equates to or is within a threshold criterion if the status is equal to or above a minimum threshold or equal to or below a maximum threshold. The status equates to or is within a range criterion if the status is equal to or within upper and lower bounds of a given range. The status equates to a state criterion if the status renders the state criterion true. For example, if the state criterion is the harvesting component 24 being activated, the state criterion is true if the harvesting component 24 is currently activated.

The controller 50 may generate a third control signal including instructions to actuate one or both of the caster wheels via the rear-steer mechanisms 26 if the status equates to or is within the criterion, as shown in block 126. For example, the controller 50 may generate the third control signal for actuating the caster wheels 22 if rear-steer mechanisms 26 are within a desirable range, the steering is changing within a specified rate or range, a ground speed of the dual path agricultural machine 10 is greater than a minimum threshold ground speed, a location of the dual path agricultural machine 10 is within a prescribed area such as within a maximum distance from a road or outside of a maximum distance from a field path end, the dual path agricultural machine 10 is undergoing back-and-forth motion, the dual path agricultural machine 10 is on an incline greater than a minimum threshold angle, and/or the harvesting component 24 is disengaged.

The controller 50 may send the third control signal to the rear-steer mechanism 26 to actuate the caster wheels 22 so as to further reduce the difference between the actual drive output and the desired drive output, as shown in block 128. The controller 50 may instruct the rear-steer mechanisms to actuate only one of the caster wheels 22 (while the other caster wheel is not actuated or is not engaged by the rear-steer mechanisms) or may instruct the rear-steer mechanisms to actuate both of the caster wheels 22. Actuation of the caster wheels 22 via the rear-steer mechanisms 26 may also be concerted with control of the drive train 34 and drive wheels 20 or may be independent therefrom.

The controller 50 may be configured to set a steering rate of absolute azimuth change and a tangential speed so that a change in absolute speed of the dual path agricultural machine 10 does not result in a change in curvature of a travel path of the dual path agricultural machine 10. The controller 50 may also control the drive system 18 according to calculated setpoints plus error compensation factors with the error compensation factors not exceeding a fixed percentage of the user drive input. The error compensation factors may include feedback from the output sensors 48 and feedback from machine geometry calculations.

The above-described stability control mode provides several advantages. For example, the controller 50 compensates for tractive losses that lead to machine drift. The stability control mode also eliminates or reduces the effects of overcorrection from human operators. Operating according to the compensation factors guarantees that a sensor failure does not immobilize the dual path agricultural machine 10 but instead only disables the stability control. The stability control mode also improves safety by responding to user drive inputs in a more predictable manner. Existing dual path agricultural machines can also be fitted with the above-described control system 30 to improve their performance.

Selective Rear-Steer Engagement And Actuation Mode

Figure 4:
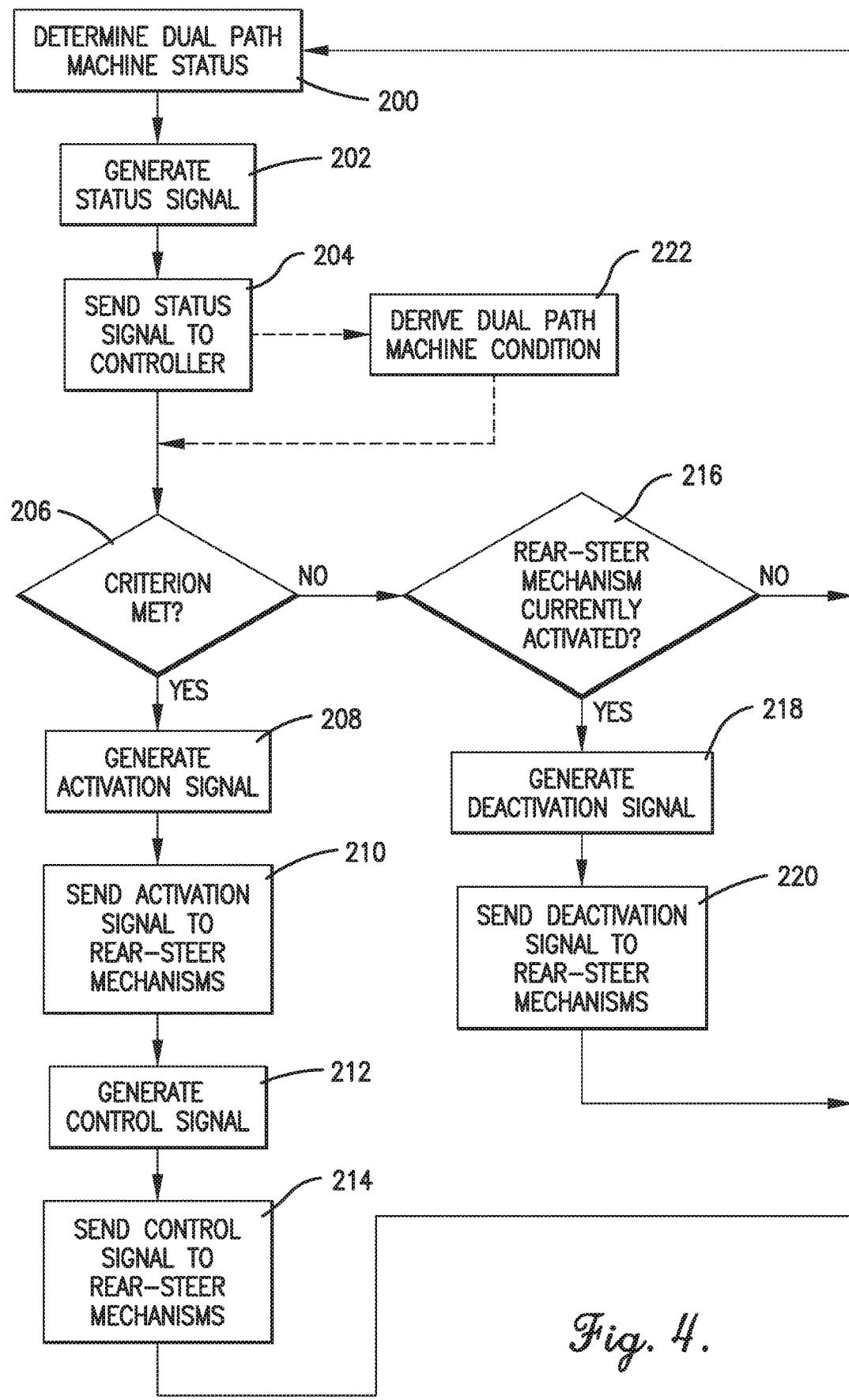
FIG. 4 is a flow diagram of a selective rear steer engagement and actuation mode implemented by the control system of FIG. 2.

The selective rear-steer engagement and actuation mode will now be described in detail, with reference to FIG. 4. First, one of the status sensors 46 may determine a status of the dual path agricultural machine 10, as shown in block 200. For example, the status may be a ground speed of the dual path agricultural machine 10, a turn angle of one of the caster wheels 22, a turn angle of the steering wheel 40, a location of the dual path agricultural machine 10 according to a GPS receiver, or any other suitable status.

The status sensor 46 may generate a signal representative of the status, as shown in block 202. Transformations of a mathematical nature like digital filters may be applied to the signal prior to comparing. The status sensor 46 may send the signal to the controller 50, as shown in block 204.

The controller 50 may compare the status against a criterion, as shown in block 206. The status equates to or is within a threshold criterion if the status is equal to or above a minimum threshold or equal to or below a maximum threshold. The status equates to or is within a range criterion if the status is equal to or within upper and lower bounds of a given range. The status equates to a state criterion if the status renders the state criterion true. For example, if the state criterion is the harvesting component 24 being activated, the state criterion is true if the harvesting component 24 is currently activated. Other criteria may include a minimum or maximum threshold ground speed, a minimum or maximum turn angle of the steering wheel 40 or one of the caster wheels 22, or any other suitable criteria. Sensor fusion may be used for more complex criteria.

The controller 50 may generate an activation signal for instructing the rear-steer mechanisms 26 to engage the caster wheels 22 if the status equates to or is within the criterion, as shown in block 208. For example, the controller 50 may generate such an activation signal if the ground speed of the dual path agricultural machine 10 is at least the minimum threshold ground speed. In addition, changes to the signal conditioning may be applied to dual path signals to drive train 34.

The controller 50 may send the activation signal to the rear-steer mechanisms 26 so that the rear-steer mechanisms 26 engage the caster wheels 22, as shown in block 210. One or both rear-steer mechanisms 26 may receive the activation signal for engaging one or both of the caster wheels 22.

The controller 50 may generate a control signal for instructing the rear-steer mechanisms 26 to actuate the caster wheels 22 if the status equates to or meets the criterion, as shown in block 212. For example, the controller 50 may generate such a control signal if the ground speed of the dual path agricultural machine 10 is at least the minimum threshold ground speed.

The controller 50 may send the control signal to the rear-steer mechanisms 26 so that the rear-steer mechanisms 26 actuate the caster wheels 22, as shown in block 214. One or both of the rear-steer mechanisms 26 may receive the control signal (or slightly different control signals) and may actuate one or both of the caster wheels 22.

On the other hand, if the criterion is not met (block 206) and the rear-steer mechanisms 26 are currently activated (block 216), the controller 50 may generate a deactivation signal, as shown in block 218. The controller 50 may send the deactivation signal to the rear-steer mechanisms 26 so as to disengage the rear-steer mechanisms 26 from the caster wheels 22, as shown in block 220. That is, the caster wheels 22 may be allowed to free-wheel if rear-steer actuation is not needed.

In another embodiment, the controller 50 may derive a condition of the dual path agricultural machine 10 based on the status, input from controls 28, and/or additional control signals 120 if available, as shown in block 222. For example, the controller 50 may determine a distance of the dual path agricultural machine 10 from a road based on the location (i.e., status) of the dual path agricultural machine 10 and a location of the road. Alternatively, a distance of the dual path agricultural machine 10 from a field path end may be determined based on the dual path agricultural machine's location. Other conditions may include a rate of change of a turn angle of the steering wheel 40 or caster wheels 22 based on successive turn angles, whether one or more attached rear-steer coils are detected, whether one or more attached rear-steer position sensors are detected, or any other condition that can be derived from the status, input, or additional signals. In this case, criteria against which the condition is compared may include a minimum or maximum distance from a road or a field path end, a minimum or maximum turn angle rate of change of the steering wheel or caster wheels, whether an optional system is installed, or any other suitable criteria.

The above-described rear-steer and actuation mode provides several advantages. For example, the controller 50 automatically disengages the rear-steer mechanisms 26 from the caster wheels 22 and/or does not actuate the caster wheels 22 via the rear-steer mechanisms 26 when the dual path agricultural machine 10 is near a field path end or when the driver is making a sharp turn, thus providing extra control range near field path ends and obstacles while still providing rear-steer stability on long, straight paths. The rear-steer mechanisms 26 and/or the caster wheels 22 can also be individually engaged or actuated in situations where rear-steer stability and a free-wheeling caster wheel is desired.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A control system for a dual path machine having a steering wheel, a set of drive wheels, a caster wheel, a rear-steer mechanism, and a drive system, the control system comprising:
   a sensor for determining a status of the dual path machine and generating a status signal representative of the status; and
      a controller communicatively coupled to the sensor, the controller being configured to compare the status against a predetermined criterion and to generate a control signal so that the rear-steer mechanism actuates the caster wheel when the status equates to the predetermined criterion,
      wherein the status is a turn angle of the steering wheel, the sensor is an angle sensor for determining the turn angle of the steering wheel, and the predetermined criterion is a value of at most a maximum threshold turn angle of the steering wheel such that the controller actuates the caster wheel via the rear-steer mechanism when the turn angle is at most the maximum threshold turn angle.

2. The control system of claim 1, the controller being further configured to generate an activation signal and send the activation signal to the rear-steer mechanism so as to engage the rear-steer mechanism with the caster wheel upon the status equating to the predetermined criterion and to generate a deactivation signal and send the deactivation signal to the rear-steer mechanism so as to disengage the rear-steer mechanism from the caster wheel upon the status not equating to the predetermined criterion so that the caster wheel is free wheeling when the status does not equate to the predetermined criterion.

3. The control system of claim 1, the status being a ground speed of the dual path machine, the sensor being a speed sensor for determining the ground speed of the dual path machine, and the predetermined criterion being a value of at least a minimum threshold speed such that the controller actuates the caster wheel via the rear-steer mechanism when the dual path machine is traveling at least the minimum threshold speed.

4. The control system of claim 1, the status being a turn angle of the caster wheel, the sensor being a wheel angle sensor for determining the turn angle of the caster wheel, and the predetermined criterion being a value of at most a maximum threshold turn angle of the caster wheel such that the controller actuates the caster wheel via the rear-steer mechanism when the turn angle is at most the maximum threshold turn angle.

5. The control system of claim 1, wherein the drive system includes two rear-steer mechanisms and two caster wheels, and the controller is configured to engage one of the two rear-steer mechanisms with one of the two caster wheels such that the other of the two caster wheels is free-wheeling.

6. The control system of claim 1, the dual path machine further having optional rear-steer, the status being input connection, the sensor being rear-steer position sensor input diagnostics, the predetermined criterion being if the sensor diagnostics detects one or more rear-steer position sensors attached such that the position sensor is detected.

7. A control system for a dual path machine having a set of drive wheels, a caster wheel, a rear-steer mechanism, and a drive system, the control system comprising:
   a sensor for determining a status of the dual path machine and generating a status signal representative of the status; and
      a controller communicatively coupled to the sensor, the controller being configured to compare the status against a predetermined criterion and to generate a control signal so that the rear-steer mechanism actuates the caster wheel when the status equates to the predetermined criterion, wherein the controller is further configured to actuate the caster wheel via the rear-steer mechanism according to calculated setpoints plus error compensation factors, the error compensation factors not exceeding a fixed percentage of a user drive input.

8. A control system for a dual path machine having a steering joystick, a set of drive wheels, a caster wheel, a rear-steer mechanism, and a drive system, the control system comprising:
   a sensor for determining a status of the dual path machine and generating a status signal representative of the status; and
      a controller communicatively coupled to the sensor, the controller being configured to compare the status against a predetermined criterion and to generate a control signal so that the rear-steer mechanism actuates the caster wheel when the status equates to the predetermined criterion, wherein the status is a position of the steering joystick, the sensor is a position sensor for determining the position of the steering joystick, and the predetermined criterion is a value of at most a maximum threshold desired steering angle requested by the steering joystick such that the controller actuates the caster wheel via the rear-steer mechanism when the desired steering angle is less than the maximum threshold desired steering angle.

9. A control system for a dual path machine having a set of drive wheels, a caster wheel, a rear-steer mechanism, and a drive system, the control system comprising:
   a sensor for determining a status of the dual path machine and generating a status signal representative of the status; and
      a controller communicatively coupled to the sensor, the controller being configured to compare the status against a predetermined criterion and to generate a control signal so that the rear-steer mechanism actuates the caster wheel when the status equates to the predetermined criterion, wherein the dual path machine further having optional rear-steer, the status being an output connection, the sensor being a coil output driver diagnostics, and the predetermined criterion being the output driver diagnostics detects one or more connected output coils such that the controller actuates the caster wheel via the rear-steer mechanism when the one or more coils is detected.

10. A control system for a dual path machine having a set of drive wheels, a caster wheel, a rear-steer mechanism, and a drive system, the control system comprising:
   a sensor for determining a status of the dual path machine and generating a status signal representative of the status; and
      a controller communicatively coupled to the sensor, the controller being configured to derive a condition of the dual path machine based on the status and compare the condition against a predetermined criterion, the controller being further configured to generate a control signal so that the rear-steer mechanism actuates the caster wheel when the condition equates to the predetermined criterion, wherein the status is a location of the dual path machine, the sensor is a GPS position receiver for determining the location, the condition is a distance of the dual path machine from a road according to the location, and the predetermined criterion is a value of at most a maximum threshold distance from the road such that the controller generates the control signal and sends the control signal to the rear-steer mechanism so as to actuate the caster wheel via the rear-steer mechanism when the distance of the dual path machine from the road is at most the maximum threshold distance from the road.

11. The control system of claim 10, the controller being further configured to generate an activation signal and send the activation signal to the rear-steer mechanism so as to engage the rear-steer mechanism with the caster wheel upon the condition equating to the predetermined criterion and to generate a deactivation signal and send the deactivation signal to the rear-steer mechanism so as to disengage the rear-steer mechanism from the caster wheel upon the condition not equating to the predetermined criterion so that the caster wheel is free wheeling when the condition does not equate to the predetermined criterion.

12. The control system of claim 10, the status being a turn angle rate of the caster wheel, the sensor being a wheel angle sensor for determining the turn angle of the caster wheel, and the predetermined criterion being a value of at most a maximum threshold turn angle rate of the caster wheel such that the controller actuates the caster wheel via the rear-steer mechanism when the turn angle rate is less than the maximum threshold turn angle rate.

13. The control system of claim 10, the dual path machine further having optional rear-steer, the status being a communication connection, the sensor being communication hardware, and the predetermined criterion being the communication hardware detects one or more rear-steer systems attached such that the controller actuates the caster wheel via the rear-steer mechanism when the one or more rear-steer systems is detected.

14. The control system of claim 10, the dual path machine further having an ability to actuate the caster wheel via the rear-steer mechanism toward a valid position when the predetermined criterion is near being met and is actively approaching a valid value.

15. A control system for a dual path machine having a set of drive wheels, a caster wheel, a rear-steer mechanism, and a drive system, the control system comprising:
a sensor for determining a status of the dual path machine and generating a status signal representative of the status; and
a controller communicatively coupled to the sensor, the controller being configured to derive a condition of the dual path machine based on the status and compare the condition against a predetermined criterion, the controller being further configured to generate a control signal so that the rear-steer mechanism actuates the caster wheel when the condition equates to the predetermined criterion, wherein the status is a location of the dual path machine, the sensor is a GPS position receiver for determining the location, the condition is a distance of the dual path machine from a field path end according to the location, and the predetermined criterion is a value of at least a minimum threshold distance from the field path end such that the controller generates the control signal and sends the control signal to the rear-steer mechanism so as to actuate the caster wheel via the rear-steer mechanism when the distance of the dual path machine from the field path end is at least the minimum threshold distance from the field path end.

16. A control system for a dual path machine having a set of drive wheels, a caster wheel, a rear-steer mechanism, and a drive system, the control system comprising:
a sensor for determining a status of the dual path machine and generating a status signal representative of the status; and
a controller communicatively coupled to the sensor, the controller being configured to derive a condition of the dual path machine based on the status and compare the condition against a predetermined criterion, the controller being further configured to generate a control signal so that the rear-steer mechanism actuates the caster wheel when the condition equates to the predetermined criterion, wherein the drive system of the dual path machine further including a steering wheel, the status being a turn angle of the steering wheel, the sensor being an angle sensor for determining the turn angle of the steering wheel, the condition being a rate of change of the turn angle, and the predetermined criterion being a value of at most a maximum threshold turn angle rate of change such that the controller generates the control signal and sends the control signal to the rear-steer mechanism so as to actuate the caster wheel via the rear-steer mechanism when the turn angle rate of change is at most the maximum threshold turn angle rate of change.

17. A control system for a dual path machine having a set of drive wheels, a caster wheel, a rear-steer mechanism, and a drive system, the control system comprising:
a sensor for determining a status of the dual path machine and generating a status signal representative of the status; and
a controller communicatively coupled to the sensor, the controller being configured to derive a condition of the dual path machine based on the status and compare the condition against a predetermined criterion, the controller being further configured to generate a control signal so that the rear-steer mechanism actuates the caster wheel when the condition equates to the predetermined criterion, wherein the dual path machine further includes a steering joystick, the status is a position of the steering joystick, the sensor is a position sensor for determining the position of the steering joystick, the predetermined criterion is a value of at most a maximum threshold desired steering angle rate requested by the steering joystick such that the controller actuates the caster wheel via the rear-steer mechanism when the desired steering angle rate is less than the maximum threshold desired steering angle rate.

18. A control system for a dual path machine having a set of drive wheels, a caster wheel, a rear-steer mechanism, and a drive system, the control system comprising:
a sensor for determining a status of the dual path machine and generating a status signal representative of the status; and
a controller communicatively coupled to the sensor, the controller being configured to derive a condition of the dual path machine based on the status and compare the condition against a predetermined criterion, the controller being further configured to generate a control signal so that the rear-steer mechanism actuates the caster wheel when the condition equates to the predetermined criterion, wherein the status is a turn angle rate of the caster wheel, the sensor is a wheel angle sensor for determining the turn angle of the caster wheel, the predetermined criterion is a value of at most a maximum threshold turn angle rate of the caster wheel such that the controller actuates the caster wheel via the rear-steer mechanism when the turn angle rate is less than the maximum threshold turn angle rate.

19. A dual path machine comprising:
a chassis;
a set of independently driven drive wheels mounted on the chassis;
a drive system for driving the drive wheels;
a set of caster wheels spaced behind the drive wheels and mounted on the chassis;
a rear-steer mechanism configured to be steerably connected to the caster wheels; and
a control system communicatively connected to the drive system, the control system comprising:
   a sensor for determining a status of the dual path machine and generating a status signal representative of the status; and
   a controller communicatively coupled to the sensor, the controller being configured to compare the status or a condition derived from the status against a predetermined criterion and to generate a control signal so that the rear-steer mechanism actuates the caster wheel when the status or condition equates to the predetermined criterion, wherein the dual path machine further includes a steering wheel, the status is a turn angle of the steering wheel, the sensor is an angle sensor for determining the turn angle of the steering wheel, and the predetermined criterion is a value of at most a maximum threshold turn angle of the steering wheel such that the controller actuates the caster wheels via the rear-steer mechanism when the turn angle is at most the maximum threshold turn angle.

20. The dual path machine of claim 19, the controller being further configured to generate an activation signal and send the activation signal to the rear-steer mechanism so as to engage the rear-steer mechanism with the caster wheels upon the status or the condition equating to the predetermined criterion and to generate a deactivation signal and send the deactivation signal to the rear-steer mechanism so as to disengage the rear-steer mechanism from the caster wheels upon the status or the condition not equating to the predetermined criterion so that the caster wheels are free wheeling when the status or the condition does not equate to the predetermined criterion.

21. The dual path machine of claim 19, the status being a ground speed of the dual path machine, the sensor being a speed sensor for determining the ground speed of the dual path machine, and the predetermined criterion being a value of at least a minimum threshold speed such that the controller actuates the caster wheels via the rear-steer mechanism when the dual path machine is traveling at least the minimum threshold speed.

22. The dual path machine of claim 19, the status being a turn angle of the caster wheels, the sensor being a wheel angle sensor for determining the turn angle of the caster wheels, and the predetermined criterion being a value of at most a maximum threshold turn angle of the caster wheels such that the controller actuates the caster wheels via the rear-steer mechanism when the turn angle is at most the maximum threshold turn angle.

23. The dual path machine of claim 19, the controller being configured to engage the rear-steer mechanism with one of the two caster wheels such that the other of the two caster wheels is free-wheeling.

24. The dual path machine of claim 19, further having optional rear-steer, wherein the status is an input connection, the sensor is a rear-steer position sensor input diagnostics, and the predetermined criterion is the sensor diagnostics detects one or more connected rear-steer position sensors such that the controller actuates the caster wheel via the rear-steer mechanism when the one or more rear-steer position sensors is detected.

25. The dual path machine of claim 19, further having optional rear-steer, the status being a communication connection, the sensor being communication hardware, and the predetermined criterion being the communication hardware detects one or more connected rear-steer systems such that the controller actuates the caster wheel via the rear-steer mechanism when the rear-steer system is detected.

26. The dual path machine of claim 19, further configured to actuate the caster wheel via the rear-steer mechanism toward a valid position when the predetermined criterion is near being met and is actively approaching a valid value.

27. A dual path machine comprising:
a chassis;
a set of independently driven drive wheels mounted on the chassis;
a drive system for driving the drive wheels;
a set of caster wheels spaced behind the drive wheels and mounted on the chassis;
a rear-steer mechanism configured to be steerably connected to the caster wheels; and
a control system communicatively connected to the drive system, the control system comprising:
   a sensor for determining a status of the dual path machine and generating a status signal representative of the status; and
   a controller communicatively coupled to the sensor, the controller being configured to compare the status or a condition derived from the status against a predetermined criterion and to generate a control signal so that the rear-steer mechanism actuates the caster wheel when the status or condition equates to the predetermined criterion, wherein the status is a location of the dual path machine, the sensor is a GPS position receiver for determining the location, the condition is a distance of the dual path machine from a road according to the location, and the predetermined criterion is a value of at most a maximum threshold distance from the road such that the controller generates the control signal and sends the control signal to the rear-steer mechanism so as to actuate the caster wheels via the rear-steer mechanism when the distance of the dual path machine from the road is at most the maximum threshold distance from the road.

28. A dual path machine comprising:
a chassis;
a steering wheel;
a set of independently driven drive wheels mounted on the chassis;
a drive system for driving the drive wheels;
a set of caster wheels spaced behind the drive wheels and mounted on the chassis;

a rear-steer mechanism configured to be steerably connected to the caster wheels; and
a control system communicatively connected to the drive system, the control system comprising:
   a sensor for determining a status of the dual path machine and generating a status signal representative of the status; and
   a controller communicatively coupled to the sensor, wherein the controller is configured to compare the status or a condition derived from the status against a predetermined criterion and to generate a control signal so that the rear-steer mechanism actuates the caster wheel when the status or condition equates to the predetermined criterion wherein, the status is a turn angle of the steering wheel, the sensor is an angle sensor for determining the turn angle of the steering wheel, the condition is a rate of change of the turn angle, and the predetermined criterion is a value of at most a maximum threshold turn angle rate of change such that the controller generates the control signal and sends the control signal to the rear-steer mechanism so as to actuate the caster wheels via the rear-steer mechanism when the turn angle rate of change is at most the maximum threshold turn angle rate of change.

29. A dual path machine comprising:
a chassis;
a set of independently driven drive wheels mounted on the chassis;
a drive system for driving the drive wheels;
a set of caster wheels spaced behind the drive wheels and mounted on the chassis;
a rear-steer mechanism configured to be steerably connected to the caster wheels;
an optional rear-steer; and
a control system communicatively connected to the drive system, the control system comprising:
   a sensor for determining a status of the dual path machine and generating a status signal representative of the status; and
   a controller communicatively coupled to the sensor, wherein the controller is configured to compare the status or a condition derived from the status against a predetermined criterion and to generate a control signal so that the rear-steer mechanism actuates the caster wheel when the status or condition equates to the predetermined criterion, wherein the status is an output connection, the sensor is a coil output driver diagnostics, the predetermined criterion is the output diagnostics detects one or more connected output coils such that the controller actuates the caster wheel via the rear-steer mechanism when the one or more output coils is detected.

* * * * *